US 6,627,719 B2

(12) United States Patent
Whipple et al.

(10) Patent No.: US 6,627,719 B2
(45) Date of Patent: Sep. 30, 2003

(54) CATIONIC LATEX TERPOLYMERS FOR SLUDGE DEWATERING

(75) Inventors: Wesley L. Whipple, Naperville, IL (US); Ananthasubramanian Sivakumar, Aurora, IL (US); Jitendra Shah, Naperville, IL (US)

(73) Assignee: Ondeo Nalco Company, Naperville, IL (US)

( * ) Notice: Subject to any disclaimer, the term of this patent is extended or adjusted under 35 U.S.C. 154(b) by 0 days.

(21) Appl. No.: 09/774,325

(22) Filed: Jan. 31, 2001

(65) Prior Publication Data

US 2003/0060586 A1 Mar. 27, 2003

(51) Int. Cl.$^7$ ............... C08F 118/02; C09K 7/02
(52) U.S. Cl. ............ 526/319; 526/307; 526/307.1; 526/310; 526/259; 526/260; 526/268; 526/254; 507/119; 524/922
(58) Field of Search ............... 507/119; 526/84, 526/87, 307.3, 307, 307.1, 310, 268, 259, 260, 280, 284, 319; 524/922

(56) References Cited

U.S. PATENT DOCUMENTS

| | | | | |
|---|---|---|---|---|
| 5,093,413 A | | 3/1992 | Bhattacharyya et al. .... | 524/804 |
| 5,282,971 A | * | 2/1994 | Degen et al. ................ | 210/645 |
| 5,693,216 A | * | 12/1997 | Hart et al. ................... | 516/148 |
| 5,702,613 A | * | 12/1997 | Sommese et al. ........... | 210/708 |
| 5,750,781 A | * | 5/1998 | Yoshida et al. ............. | 564/153 |
| 5,986,030 A | * | 11/1999 | Murray et al. ............... | 526/268 |
| 6,036,868 A | * | 3/2000 | Sivakumar et al. ......... | 210/708 |
| 6,124,396 A | * | 9/2000 | Hahn et al. .................. | 524/801 |
| 6,153,288 A | * | 11/2000 | Shih et al. ................... | 428/195 |
| 6,281,172 B1 | * | 8/2001 | Warren et al. ............... | 507/110 |
| 6,344,531 B1 | * | 2/2002 | Murray et al. ............... | 526/268 |
| 6,365,052 B1 | * | 4/2002 | Sivakumar et al. ......... | 210/728 |
| 6,369,182 B1 | * | 4/2002 | Whipple et al. ............. | 526/307 |
| 6,451,756 B2 | * | 9/2002 | Shulman et al. ............ | 510/475 |
| 6,454,003 B1 | * | 9/2002 | Chang et al. ................ | 166/270 |

* cited by examiner

*Primary Examiner*—Tatyana Zalukaeva
(74) *Attorney, Agent, or Firm*—Michael B. Martin; Thomas M. Breiningern

(57) ABSTRACT

A cationic latex terpolymer prepared by polymerizing from about 1 to about 99.1 mole percent of one or more cationic monomers, from about 0.9 to about 5 mole percent of one or more hydroxyalkyl (meth)acrylates and from 0 to about 98.1 mole percent of one or more nonionic monomers is useful for dewatering sludge.

9 Claims, No Drawings

CATIONIC LATEX TERPOLYMERS FOR SLUDGE DEWATERING

TECHNICAL FIELD

This invention concerns polymers for waste water clarification. More particularly, this invention is directed to cationic latex terpolymer flocculants and their use for sludge dewatering.

BACKGROUND OF THE INVENTION

The dewatering of sewage sludges and similar organic suspensions, may be augmented by mixing into them chemical reagents in order to induce a state of coagulation or flocculation which thereby facilitates the process of separation of water. For this purpose, lime or salts of iron or aluminum have been utilized. More recently, synthetic polyelectrolytes, particularly certain cationic copolymers of acrylamide have been found to be useful.

Notwithstanding the variety of commercially available polymers which have been found to be capable of flocculating or coagulating organic sludges, there are various circumstances which tend to limit the usefulness of these reagents. Thus, while for certain sludges economical treatments with these known reagents are feasible, more often sludges require very high and cost-ineffective dosages of reagents in order to treat them successfully. Moreover, variations often occur in sludge from any one source. For example, variations in the supply of material to the sludge making process and/or in the oxidizing conditions that may be involved in the production of the sludge lead to a variety of particle types which must be removed. Furthermore, it is not uncommon to encounter sludges which are, for some reason, not amenable to flocculation by any of the known polymeric flocculating agents. It is therefore an object of the invention to provide to the art a superior method for the dewatering of sludge-containing waste waters.

A cationic water-in-oil emulsion polymer of acrylamide and a cationic monomer incorporating from about 0.1 to 0.75 mole percent of a hydroxyalkyl (meth)acrylate and from about 0.01 to 0.075 weight percent of a chain transfer agent for dewatering sludge is disclosed in U.S. Pat. No. 5,093,413. However, these polymers are relatively inefficient for dewatering sludge under high shear conditions such as centrifuge dewatering. Therefore, another object of this invention is to provide a new class of polymers that provide superior dewatering performance under high shear conditions.

SUMMARY OF THE INVENTION

We have discovered that cationic latex terpolymers incorporating from about 0.9 to about 5 mole percent hydroxyalkyl (meth)acrylate momomer(s) provide superior sludge dewatering performance, particularly under high shear conditions.

Accordingly, in its principal aspect, this invention is directed to a cationic latex terpolymer prepared by polymerizing from about 1 to about 99.1 mole percent of one or more cationic monomers, from about 0.9 to about 5 mole percent of one or more hydroxyalkyl (meth)acrylates and from 0 to about 98.1 mole percent of one or more nonionic monomers.

In another aspect, this invention is directed to a method of dewatering sludge comprising adding to the sludge an effective amount of a a cationic latex terpolymer prepared by polymerizing from about 1 to about 99.1 mole percent of one or more cationic monomers, from about 0.9 to about 5 mole percent of one or more hydroxyalkyl (meth)acrylates and from 0 to about 98.1 mole percent of one or more nonionic monomers.

In another aspect, this invention is directed to a polymer composition comprising a fluorescent tracer compound and a cationic latex terpolymer prepared by polymerizing from about 1 to about 99.1 mole percent of one or more cationic monomers, from about 0.9 to about 5 mole percent of one or more hydroxyalkyl (meth)acrylates and from 0 to about 98.1 mole percent of one or more nonionic monomers.

DETAILED DESCRIPTION OF THE INVENTION

Definitions of Terms

"Alkyl" means a monovalent group derived from a straight or branched chain saturated hydrocarbon by the removal of a single hydrogen atom. Representative alkyl groups include methyl, ethyl, n- and iso-propyl, and the like.

"Alkylene" means a divalent group derived from a straight or branched chain saturated hydrocarbon by the removal of two hydrogen atoms. Representative alkylene groups include methylene, ethylene, propylene, and the like.

"Based on polymer active" and "based on monomer" mean the amount of a reagent added based on the level of vinylic monomer in the formula, or the level of polymer formed after polymerization, assuming 100% conversion.

"Based on formula" means the amount of reagent added based on the total formula weight.

"Cationic Monomer" means a monomer as defined herein which possesses a net positive charge. Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethyaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminopropylacrylamide methyl sulfate quaternary salt, dimethylaminopropylacrylamide sulfuric acid salt, dimethylaminopropylacrylamide hydrochloric acid salt, methacrylamidopropyltrimethylammonium chloride, dimethylaminopropylmethacrylamide methyl sulfate quaternary salt, dimethylaminopropylmethacrylamide sulfuric acid salt, dimethylaminopropylmethacrylamide hydrochloric acid salt, diethylaminoethyl acrylate, diethylaminoethyl methacrylate, diallyldiethylammonium chloride and diallyldimethyl ammonium chloride. Alkyl groups are generally $C_{1-4}$ alkyl. Preferred cationic monomers are dimethylaminoethyl acrylate methyl chloride quaternaryl salt, dimethylaminoethyl methacrylate methyl chloride quaternary salt, acrylamidopropyltrimethylammonium chloride and methacrylamidopropyltrimethylammonium chloride. Dimethylaminoethyl acrylate methyl chloride quaternary salt is more preferred.

"Chain Transfer Agent" means any molecule, used in free-radical polymerization, which will react with a polymer radical forming a dead polymer and a new radical. Representative Chain Transfer Agents are listed by K. C. Berger and G. Brandrup, "Transfer Constants to Monomer, Polymer, Catalyst, Solvent, and Additive in Free Radical Polymerization," Section II, pp. 81–151, in "Polymer Handbook," edited by J. Brandrup and E. H. Immergut, 3d edition, 1989, John Wiley & Sons, New York. Preferred chain transfer agents include sodium formate, 2-mercaptoethanol and isopropanol. Sodium formate is more preferred.

"Hydroxyalkyl (meth)acrylate" means a compound of formula

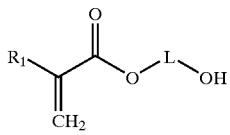

where $R_1$ is H or $CH_3$ and L is $C_1$–$C_8$, preferably $C_1$–$C_4$ alkylene. Representative hydroxyalkyl (meth)acrylates include hydroxyethyl acrylate, hydroxypropyl acrylate, hydroxybutyl acrylate, hydroxyethyl methacrylate, hydroxypropyl methacrylate, 6-hydroxyhexyl methacrylate, and the like. 2-Hydroxyethyl methacrylate (HEMA) and 2-hydroxypropyl methacrylate are preferred.

"Latex polymer" means a water-in-oil polymer emulsion comprising a cationic terpolymer according to this invention in the aqueous phase, a hydrocarbon oil for the oil phase and one or more water-in-oil emulsifying agents. Latex polymers are hydrocarbon continuous with the water-soluble polymers dispersed within the hydrocarbon matrix. The latex polymer is "inverted" or activated for use by releasing the polymer from the particles using shear, dilution, and, generally, another surfactant. See U.S. Pat. No. 3,734,873, incorporated herein by reference. Representative preparations of high molecular weight inverse emulsion polymers are described U.S. Pat. Nos. 2,982,749; 3,284,393; and 3,734,873. See also, "Mechanism, Kinetics and Modeling of the Inverse-Microsuspension Homopolymerization of Acrylamide," Hunkeler, et al., *Polymer* (1989), 30(1), 127–42; and "Mechanism, Kinetics and Modeling of Inverse-Microsuspension Polymerization: 2. Copolymerization of Acrylamide with Quaternary Ammonium Cationic Monomers," Hunkeler et al., *Polymer* (1991), 32(14), 2626–40.

Inverse emulsion polymers are prepared by dissolving the desired monomers and any polymerization additives such as inorganic salts, chelants, pH buffers, and the like in the aqueous phase, dissolving the emulsifying agent(s) in the oil phase, emulsifying the water phase in the oil phase to prepare a water-in-oil emulsion, in some cases, homogenizing the water-in-oil emulsion, polymerizing the monomers dissolved in the water phase of the water-in-oil emulsion to obtain the polymer as a water-in-oil emulsion. If so desired, a self-inverting surfactant can be added after the polymerization is complete in order to obtain the water-in-oil self-inverting emulsion.

The oil phase comprises any inert hydrophobic liquid. Preferred hydrophobic liquids include aliphatic and aromatic hydrocarbon liquids including benzene, xylene, toluene, paraffin oil, mineral spirits, kerosene, naphtha, and the like. A paraffinic oil is preferred.

Free radical yielding initiators such as benzoyl peroxide, lauroyl peroxide, 2,2'-azobis (isobutyronitrile) (AIBN), 2,2'-azobis(2,4-dimethylvaleronitrile) (AIVN), potassium persulfate and the like are useful in polymerizing vinyl and acrylic monomers. 2,2'-azobis(isobutyronitrile) (AIBN) and 2,2'-azobis(2,4-dimethylvaleronitrile) (AIVN) are preferred.

The initiator is utilized in amounts ranging between about 0.002 and about 0.2 percent by weight of the monomers, depending upon the solubility of the initiator.

Water-in-oil emulsifying agents useful for preparing the latex polymers of this invention include sorbitan esters of fatty acids, ethoxylated sorbitan esters of fatty acids, and the like or mixtures thereof. Preferred emulsifying agents include sorbitan monooleate, polyoxyethylene sorbitan monostearate, and the like. Additional details on these agents may be found in McCutcheon's *Detergents and Emulsifiers*, North American Edition, 1980. Any inverting surfactant or inverting surfactant mixture described in the prior art may be used. Representative inverting surfactants include ethoxylated nonylphenol, ethoxylated linear alcohols, and the like. Preferred inverting surfactants are ethoxylated linear alcohols.

The polymer is prepared by polymerizing the appropriate monomers at a temperature of from about 30° C. to about 85° C. over about 1 to about 24 hours, preferably at a temperature of from about 40° C. to about 70° C. over about 3 to about 6 hours. Upon completion of the reaction, the water-in-oil emulsion polymer is cooled to room temperature, where any desired post-polymerization additives, such as antioxidants, or a high HLB surfactant (as described in U.S. Pat. No. 3,734,873) may be added.

The resulting emulsion polymer is a free-flowing liquid. An aqueous solution of the water-in-oil emulsion polymer can be generated by adding a desired amount of the emulsion polymer to water with vigorous mixing in the presence of a high-HLB surfactant (as described in U.S. Pat. No. 3,734,873).

"Monomer" means a polymerizable allylic, vinylic or acrylic compound. The monomer may be cationic or non-ionic. Vinyl monomers are preferred, acrylic monomers are more preferred.

"Nonionic monomer" means a monomer as defined herein which is electrically neutral. Representative non-ionic, water-soluble monomers include acrylamide, methacrylamide, N,N-dimethylacrylamide, N,N-diethylacrylamide, N-isopropylacrylamide, N-vinylformamide, N-vinylmethylacetamide, N-vinyl pyrrolidone, N-t-butylacrylamide, N-methylolacrylamide, and the like. Preferred nonionic monomers are acrylamide and methacrylamide. Acrylamide is more preferred.

"RSV" stands for Reduced Specific Viscosity. The RSV of a polymer solution is a measure of the capacity of polymer molecules to enhance the viscosity of the solution at a given concentration, which depends on the structure of the polymer molecules (including size and shape), and interaction between polymer molecules. Within a series of polymer homologs which are substantially linear and well solvated, "reduced specific viscosity (RSV)" measurements for dilute polymer solutions are an indication of polymer chain length and average molecular weight according to Paul J. Flory, in "*Principles of Polymer Chemistry*", Cornell University Press, Ithaca, N.Y., 1953, Chapter VII, "*Determination of Molecular Weights*", pp. 266–316. The RSV is measured at a given polymer concentration and temperature and calculated as follows:

$$RSV = \frac{\left[\left(\frac{\eta}{\eta_o}\right) - 1\right]}{c}$$

wherein $\eta$=viscosity of polymer solution;
$\eta_o$=viscosity of solvent at the same temperature; and
c=concentration of polymer in solution.

The units of concentration "c" are (grams/100 ml or g/deciliter). Therefore, the units of RSV are dL/g. In this patent application, for measuring RSV, the solvent used is 1.0 molar sodium nitrate solution. The polymer concentration in this solvent is 0.045 g/dL. The RSV is measured at 30° C. The viscosities $\eta$ and $\eta_o$ are measured using a Cannon Ubbelohde semimicro dilution viscometer, size 75. The viscometer is mounted in a perfectly vertical position in a constant temperature bath adjusted to 30±0.02° C. The error inherent in the calculation of RSV is about 2 dl/grams. When two polymer homologs within a series have similar RSV's that is an indication that they have similar molecular weights.

Preferred Embodiments

In a preferred aspect of this invention, the nonionic monomers are selected from acrylamide and methacrylamide and the cationic monomers are selected from dimethylaminoethyl acrylate methyl chloride quaternary salt, dimethylaminoethyl methacrylate methyl chloride quaternary salt, acrylamidopropyltrimethylammonium chloride and methacrylamidopropyltrimethylammonium chloride.

In another preferred aspect, the hydroxyalkyl (meth) acrylate is selected from hydroxyethyl acrylate, hydroxypropyl acrylate, hydroxybutyl acrylate, hydroxyethyl methacrylate, hydroxypropyl methacrylate and 6-hydroxyhexyl methacrylate.

In another preferred aspect, the cationic latex polymer is prepared by polymerizing from about 20 to about 80 mole percent of one or more cationic monomers, from about 1 to about 2.5 mole percent of one or more hydroxyalkyl (meth) acrylates and from 17.5 to about 79 mole percent of one or more nonionic monomers.

In another preferred aspect, the nonionic monomer is acrylamide and the cationic monomer is dimethylaminoethyl acrylate methyl chloride quaternary salt.

In another preferred aspect, the hydroxyalkyl (meth) acrylate is hydroxyethyl methacrylate.

Sludges suitable for treatment using the polymers of this invention include primary, waste activated and aerobically and anaerobically digested industrial and municipal biosolids.

The total amount of polymer required to effectively flocculate the sludge may vary considerably according to the characteristics of the sludge being treated and the degree of dewatering required. Typically, the polymer is added in an amount of from about 10 ppm to about 600 ppm, preferably from about 15 ppm to about 400 ppm more preferably from about 20 ppm to about 200 ppm based on polymer actives.

Addition may be by conventional methods. Some agitation of the mixture of sludge and flocculent may be necessary to bring about flocculation. Thereafter separation of the separated solids from liquid may be effected by conventional methods, such as filtration and/or sedimentation.

In a preferred aspect of this invention, the sludge is dewatered by a high shear process.

In another preferred aspect, the high shear process is centrifuge sludge dewatering.

In centrifuge sludge dewatering, solids-liquid separation occurs in a centrifuge by rotating the sludge at high speeds to cause separation by gravitational forces. The gravitational force achieved in the centrifuge is in the range of 2000–3000 G. The solid bowl centrifuge is the type most often used for dewatering sludges. Solid bowl centrifuges are continuous flow-through systems.

The conical-cylindrical design is the most commonly used solid bowl centrifuge. It is a more flexible machine and can shift the balance of cake dryness and centrate quality over a broader range, depending upon the desired performance criteria. The conical-cylindrical solid bowl centrifuge consists of a rotating unit comprising a bowl and a conveyor joined through a special system of gears, which cause the bowl and conveyor to rotate in the same direction, but at slightly different speeds. The conical section at one end of the bowl forms a dewatering beach over which the conveyor pushes the sludge to outlet ports. The clarified supernatant liquid is allowed to escape over weirs or is removed by a skimmer.

The flocculated sludge upon entering the bowl is immediately subjected to not only the gravitational force, but also, to high impact shear arising from the sludge hitting the bowl wall. The sludge then travels to the conveyor section and the solids and liquid are separated. The shear involved in the centrifuge is different from that experienced in other dewatering devices such as belt filter press. In the latter, the water is initially allowed to drain by gravity after which the sludge is squeezed under pressure by the belts to release the extra water. Due to the high impact shear in the centrifuge, the flocs tend to break down rapidly and need polymers than can impart high floc strength. As shown below, the cationic terpolymers of this invention provide flocs of high shear strength compared to the prior art cationic polymers.

The performance of the cationic terpolymers of this invention may be monitored by means of an inert fluorescent tracer as described in U.S. Pat. No. 4,783,314, incorporated herein by reference. In particular, a composition comprising a cationic latex terpolymer according to this invention and an inert fluorescent tracer compound in a known ratio is added to the sludge being treated as described above. The fluorescent emission of the treated sludge is measured and used to quantify and control the amount and feed rate of the polymer to achieve maximum dewatering performance.

"Inert fluorescent tracer compound" means a material which is capable of fluorescing while present in the sludge being treated. The inert fluorescent tracer compound should not be appreciably affected by any other material present in the sludge, or by the temperature or temperature changes encountered during the dewatering process. Representative inert fluorescent tracer compounds include mono-, di-, and trisulfonated naphthalenes and their water soluble salts, sulfonated derivatives of pyrene and their water soluble salts such as 1,3,6,8-pyrenetetrasulfonic acid, and Acid Yellow 7. A preferred inert fluorescent tracer compound is 1,3,6,8-pyrenetetrasulfonic acid, sodium salt.

The cationic latex terpolymer/inert fluorescent tracer compound composition is prepared by adding the inert fluorescent tracer compound with stirring to the cationic latex terpolymer of this invention. An inverting surfactant as described herein may be added along with the inert fluorescent tracer compound. The amount of inert fluorescent tracer compound added may be readily determined by one of ordinary skill in the art, taking into consideration the polymer composition and the characteristics of the sludge being treated.

The foregoing may be better understood by reference to the following Examples, which are presented for purposes of illustration and are not intended to limit the scope of this invention.

EXAMPLE 1

Preparation of Acrylamide/Dimethylaminoethyl Acrylate Methyl Chloride Quaternary Salt/Hydroxyethyl Methacrylate (49.2/49.8/1.0) Terpolymer.

An aqueous monomer phase is made-up by stirring together 211.3 g of a 48.9% aqueous solution of acrylamide (Nalco Chemical Co., Naperville, Ill.), 45.8 g of water, and 9.0 g of adipic acid. The components are stirred until dissolved. To the resulting solution is added 354.7 g of a 80.5% solution of dimethylaminoethyl acrylate methyl chloride quaternary salt (DMAEA•MCQ, NCF Manufacturing, Inc., Riceboro, Ga.), 3.8 g of hydroxyethyl methacrylate (Rocryl® 400, Rohm and Haas Company, Philadelphia, Pa.) and 0.12 g of EDTA•4Na⁺ (ethylenediaminetetraacetic acid, tetrasodium salt, Van Waters & Rogers, Geismar, La.).

An oil phase is prepared by heating a mixture of 252.0 g of paraffinic oil (Escaid® 110, Exxon Chemical Company, Houston, Tex.), 9.0 g of Span® 80 (sorbitan monooleate, ICI Specialty Chemicals, Wilmington, Del.) and 18.9 g of Tween® 61 (POE (4) sorbitan monostearate, ICI Specialty Chemicals, Wilmington, Del.) until the surfactants dissolve (54–57° C.). The oil phase is charged into a 2 L reactor. With vigorous stirring (900 rpm, 10 mm rod with a teflon paddle at the base and 6-blade turbine mounted 3-inches from the bottom), the monomer phase is added over 2 minutes. The resulting mixture is stirred for 30 minutes at 42° C.

To the water-in-oil emulsion is added 0.297 g of AIBN (2,2'-azobis(isobutyronitrile), E. I. duPont Nemours & Co. Inc.; Wilmington, Del.) and 0.045 g of AIVN (2,2'-azobis (2,4-dimethylvaleronitrile), E. I. duPont Nemours & Co. Inc.; Wilmington, Del.). The polymerization is carried out under a $N_2$ atmosphere at 42–45° C. for 3 hours, then 74° C. for one hour. Upon completion of the polymerization, the reaction mixture is cooled to room temperature.

The resulting latex polymer has a Brookfield Viscosity of 497 cps (#2 spindle at 30 rpm). A polymer solution is made by mixing 2.0 g of the water-in-oil emulsion polymer with 198.0 g of water containing 0.12 g of Alfonic® 1412–60 (available from Vista Chemical Co., Houston, Tex.) in a 300 ml beaker for 30 minutes with vigorous stirring. An RSV of 6.6 dl/g (1M $NaNO_3$, 450 ppm, 30° C.) is measured for the terpolymer.

The properties of representative cationic terpolymers of this invention are summarized in Table 1. The polymers are prepared according to the method of Example 1.

TABLE 1

Properties of Representative Cationic Terpolymers

| Polymer ID | Mole % DMAEA.MCQ | Mole % HEMA | Weight % Sodium Formate | RSV (dL/g) |
|---|---|---|---|---|
| A | 30 | 1.00 | 0.00 | 5.9 |
| B | 30 | 1.25 | 0.00 | 4.6 |
| C | 50 | 1.00 | 0.00 | 6.6 |
| D | 50 | 1.25 | 0.00 | 6.9 |
| E | 50 | 1.25 | 0.00 | 5.9 |
| F | 65 | 1.23 | 0.00 | 10.3 |
| G | 65 | 2.09 | 0.00 | 5.5 |

EXAMPLE 2

Preparation of an Acrylamide/Dimethylaminoethyl Acrylate Methyl Chloride Quaternary Salt/Hydroxyethyl Methacrylate (49.2/49.8/1.0) Terpolymer Containing a Fluorescent Tracer.

A self-inverting polymer containing a fluorescent traser is made by mixing 16.8 g of Alfonic® 1412–60 (available from Vista Chemical Co., Houston, Tex.) into the water-in-oil polymer mixture of Example 1 over a period of 15 minutes and then adding 9.0 g of a 10% aqueous solution of pyrenetetrasulfonic acid, sodium salt (available from B. F. Goodrich, Cleveland, Ohio) over a period of 15 minutes.

EXAMPLE 3

Centrifuge Bench Test.

The polymer is added to 20 ml of sludge in a centrifuge tube at the desired concentration and mixed using a vortex mixer for 10 seconds. The sludge is then centrifuged at 1000G for 1 minute. This is followed by further mixing on the vortex mixer for 10 seconds. The flocs are then observed visually and a rating of 0–4 is given, with 4 being the best. A polymer that produces a rating of 3 or 4 would be effective on the centrifuge. The bench test has been extensively correlated with actual performance on the centrifuge in field trials.

The properties of representative polymers containing up to 0.76 mole percent hydroxyethylmethacrylate (HEMA), representative of the prior art compositions, are summarized in Table 2. The polymers are prepared as described in U.S. Pat. No. 5,093,413.

The centrifuge bench test data for representative polymers of this invention and the representative prior art polymers of Table 2 is summarized in Tables 3–5.

TABLE 2

Properties of Representative Polymers Described in U.S. Pat. No. 5,093,413

| Polymer ID | Mole % DMAEA.MCQ | Mole % HEMA | Weight % Sodium Formate | RSV (dL/g) |
|---|---|---|---|---|
| H | 30 | 0.25 | 0.025 | 16.5 |
| I | 30 | 0.00 | 0.00 | 24.8 |
| J | 30 | 0.75 | 0.00 | 5.2 |
| K | 50 | 0.50 | 0.00 | 3.0 |
| L | 50 | 0.50 | 0.025 | 14.6 |
| M | 50 | 0.76 | 0.00 | 6.5 |
| N | 50 | 0.75 | 0.00 | 11.3 |
| O | 65 | 0.74 | 0.00 | 12.1 |

TABLE 3

Centrifuge Bench Test Data for Polymers Containing 30 mole % DMAEA.MCQ

| Polymer ID | RSV (dl/g) | Dosage (1% soln), g | Floc Rating | Comments |
|---|---|---|---|---|
| H | 16.5 | 0.5 | 0 | |
|  |  | 0.75 | 2 | |
|  |  | 1.0 | 2 | |
|  |  | 1.25 | 2 | Overdose |
| I | 29.2 | 0.5 | 0 | |
|  |  | 0.61 | 0 | |
|  |  | 0.75 | 2 | |
|  |  | 1.0 | 2 | Overdose |
| J | 5.2 | 1.0 | 0 | |
|  |  | 1.5 | 0 | |
|  |  | 1.75 | 0 | |
|  |  | 2.0 | 4 | |
| A | 5.9 | 1.5 | 0 | |
|  |  | 1.75 | 2 | |
|  |  | 1.82 | 4 | |
|  |  | 2.0 | 4 | |
| B | 4.6 | 1.5 | 0 | |
|  |  | 1.75 | 0 | |
|  |  | 2.0 | 2 | |
|  |  | 2.25 | 4 | |

TABLE 4

Centrifuge Bench Test Data for Polymers Containing 50 mole % DMAEA.MCQ

| Polymer ID | RSV (dl/g) | Dosage (1% soln), g | Floc Rating | Comments |
|---|---|---|---|---|
| K | 3.0 | 1.5 | 0 | |
|  |  | 2.0 | 0 | |
|  |  | 2.25 | 1 | |
|  |  | 2.5 | 4 | |
|  |  | 3.0 | 2 | Overdose |
| L | 14.6 | 0.5 | 0 | |
|  |  | 0.75 | 1 | |
|  |  | 1.0 | 2 | |
|  |  | 1.5 | 1 | |
| M | 6.5 | 1.25 | 0 | |
|  |  | 1.5 | 1 | |
|  |  | 1.75 | 2 | |
|  |  | 2.0 | 1 | |
| C | 6.6 | 1.25 | 1 | |
|  |  | 1.5 | 4 | |
|  |  | 1.75 | 3 | Overdose |
| D | 6.9 | 1.25 | 0 | |
|  |  | 1.5 | 2 | |
|  |  | 1.75 | 2 | Overdose |
|  |  | 2.0 | 2 | Overdose |
| N | 11.3 | 0.75 | 0 | |
|  |  | 1.0 | 1 | |
|  |  | 1.25 | 2 | |
|  |  | 1.5 | 2 | Overdose |
| E | 5.9 | 1.0 | 0 | |
|  |  | 1.25 | 0 | |
|  |  | 1.5 | 1 | |
|  |  | 1.75 | 4 | |

TABLE 5

Centrifuge Bench Test Data for Polymers Containing 65 mole % DMAEA.MCQ

| Polymer ID | RSV (dl/g) | Dosage (1% soln), g | Floc Rating | Comments |
|---|---|---|---|---|
| O | 12.1 | 0.7 | 0 | |
|  |  | 1.0 | 1 | |
|  |  | 1.25 | 2 | Overdose |
| F | 10.3 | 1.0 | 1 | |
|  |  | 1.25 | 2 | |
|  |  | 1.5 | 2 | |
|  |  | 2.0 | 2 | Overdose |
| G | 5.5 | 1.0 | 3 | |
|  |  | 1.25 | 4 | |
|  |  | 1.5 | 3 | Overdose |
|  |  | 1.75 | 3 | Overdose |

As Shown in Tables 3–5, the prior art polymers containing 0.76 mole percent or less of hydroxyethylmethacrylate are either not effective or are inefficient (i.e. require a higher polymer dose) in comparison to the polymers of this invention.

Various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

What is claimed is:

1. A cationic latex terpolymer prepared by polymerizing from about 1 to about 99.1 mole percent of one or more cationic monomers, from about 0.9 to about 5 mole percent of one or more hydroxyalkyl (meth)acrylates and from 0 to about 98.1 mole percent of one or more nonionic monomers, wherein the nonionic monomers are selected from acrylamide and acrylamide and the cationic monomers are selected from dimethylaminoethyl acrylate methyl chloride quaternary salt, dimethylaminoethyl Methacrylate methyl chloride quaternary salt, acrylamidopropyltrimethylammonium chloride and methacrylamidopropyltrimethylammonium chloride.

2. The cationic latex terpolymer of claim 1 wherein the hydroxyalkyl (meth)acrylate is selected from hydroxyethyl acrylate, hydroxypropyl acrylate, hydroxybutyl acrylate, hydroxyethyl methacrylate, hydroxypropyl methacrylate and 6-hydroxyhexyl methacrylate.

3. The cationic latex terpolymer of claim 2 prepared by polymerizing from about 20 to about 80 mole percent of one or more cationic monomers, from about 1 to about 2.5 mole percent of one or more hydroxyalkyl (meth)acrylates and from 17.5 to about 79 mole percent of one or more nonionic monomers.

4. The cationic latex terpolymer of claim 3 wherein the nonionic monomer is acrylamide and the cationic monomer is dimethylaminoethyl acrylate methyl chloride quaternary salt.

5. The cationic latex terpolymer of claim 4 wherein the hydroxyalkyl (meth)acrylate is hydroxyethyl methacrylate.

6. A method of dewatering sludge comprising adding an effective amount of the cationic latex terpolymer of claim 1 to the sludge.

7. The method of claim 6 wherein the sludge is dewatered by a high shear process.

8. The method of claim 7 wherein the high shear process is centrifuge dewatering.

9. A chemical composition comprising the cationic terpolymer of claim 1 and an inert tracer compound.

* * * * *